Dec. 9, 1958 M. FIEHL 2,863,662

SHEET FEEDING AND HANDLING DEVICE

Filed Oct. 12, 1956 5 Sheets-Sheet 1

INVENTOR.
MICHAEL FIEHL
BY William N. Barret Jr.
ATTORNEY

Dec. 9, 1958 M. FIEHL 2,863,662

SHEET FEEDING AND HANDLING DEVICE

Filed Oct. 12, 1956 5 Sheets-Sheet 2

Dec. 9, 1958 M. FIEHL 2,863,662

SHEET FEEDING AND HANDLING DEVICE

Filed Oct. 12, 1956 5 Sheets-Sheet 4

Dec. 9, 1958 M. FIEHL 2,863,662

SHEET FEEDING AND HANDLING DEVICE

Filed Oct. 12, 1956 5 Sheets-Sheet 5

United States Patent Office 2,863,662
Patented Dec. 9, 1958

2,863,662

SHEET FEEDING AND HANDLING DEVICE

Michael Fiehl, Endicott, N. Y., assignor to International Business Machines Corporation, New York, N. Y., a corporation of New York Application October 12, 1956, Serial No. 615,688

20 Claims. (Cl. 271—61)

This invention relates in general to a sheet feeding and handling device and in particular to a record card feeding and handling device for use with a high speed record card machine.

An illustrative embodiment of the present invention is shown and described for use with a sorter having a high speed record card feeding mechanism of the type disclosed and claimed in the copending U. S. patent application, Serial No. 431,316, filed on May 21, 1954, by G. A. Luning et al. It is to be understood, however, that the present invention may be applied to other record card controlled machines since the invention is not dependent on the particular machine on which it is used.

Conventional sheet or card feed hoppers as developed for use with most commercially available record card machines, such as the afore-mentioned sorter, will hold approximately 1000 cards when full. The design of the card feeding mechanism associated with this hopper is such as to provide satisfactory feeding of the bottommost card of the batch of cards in the hopper whether said batch consists of 1000 cards or a bare minimum of only one card. While the design of the card feeding mechanism is such as to provide satisfactory feeding when there is a large number of cards or a small number of cards, it is also true that an optimum condition would be had where there is a nearly constant number of cards in the feed hopper at all times. This would allow for a more nearly constant weight on the bottommost card and therefore a constant situation confronting the picker knife so that the possibility that the bottommost card would fail to feed due to too few or too many cards is avoided.

In line with the foregoing, it should be clear that to increase the size of a card feed hopper to where it might be capable of handling a batch of cards in the neighborhood of 3000 to 5000 cards, for example, would cause serious card feeding problems to appear because of the added weight produced by the additional cards. Thus, it may be stated in general that to provide a conventional record card machine with a hopper capable of handling a batch of cards considerably in excess of the one thousand cards will afford a card feeding device which is totally inadequate and unsatisfactory because of its unreliability.

Considering once again a conventional 1000-card size hopper for use with a record card machine having a card feeding rate of 400 cards per minute (c. p. m.), for example, it is clear that a full hopper will hold a sufficient number of cards to provide approximately 2½ minutes of machine operating time. With the advent of the afore-mentioned Luning et al. high speed card feeding device whereby 1000 c. p. m. may be handled very easily, it would be necessary to increase the size of the record card hopper 2½ times to afford the 2½ minutes of card feeding operation referred to hereinabove. As has already been brought out previously, the use of such a large card hopper is not feasible. On the other hand, the use of a conventional 1000-card size hopper with a 1000 c. p. m.

card feeding device would cut down the length of machine operating time to approximately one minute.

To solve the problem of reduced operating time on high speed card feeding machines when using a conventional size hopper, and to increase the operating time of record card feeding machines, an auxiliary card storage magazine has been operatively associated with the card hopper mechanism. This magazine is capable of holding a large quantity, e. g., 3000 to 5000, of record cards which are advanced in a predetermined order from the magazine to the hopper as required. Accordingly, a broad object of this invention is to provide an improved card feeding and handling device.

Another object of this invention is to provide an improved card feeding and handling device for effecting the positive feeding of cards in a predetermined manner from a storage magazine to a machine card hopper.

In line with the foregoing, another object of this invention is to provide an improved card feeding and handling device for so controlling the feeding of cards from a storage magazine to a machine card hopper as to keep fairly constant the size of the batch of cards in said hopper.

As cards are fed by the subject card feeding and handling device from the storage magazine to the machine card hopper, the cards being added are both fanned for better feeding out of the hopper and joggled into alignment with the cards in said hopper. Accordingly, another object of this invention is to provide a high speed card feeding and handling device for fanning and aligning cards being fed from a card storage magazine to a machine card hopper.

Other objects of the invention will be pointed out in the following description and claims and illustrated in the accompanying drawings, which disclose, by way of example, the principle of the invention and the best mode, which has been contemplated, of applying that principle.

Figure 1:
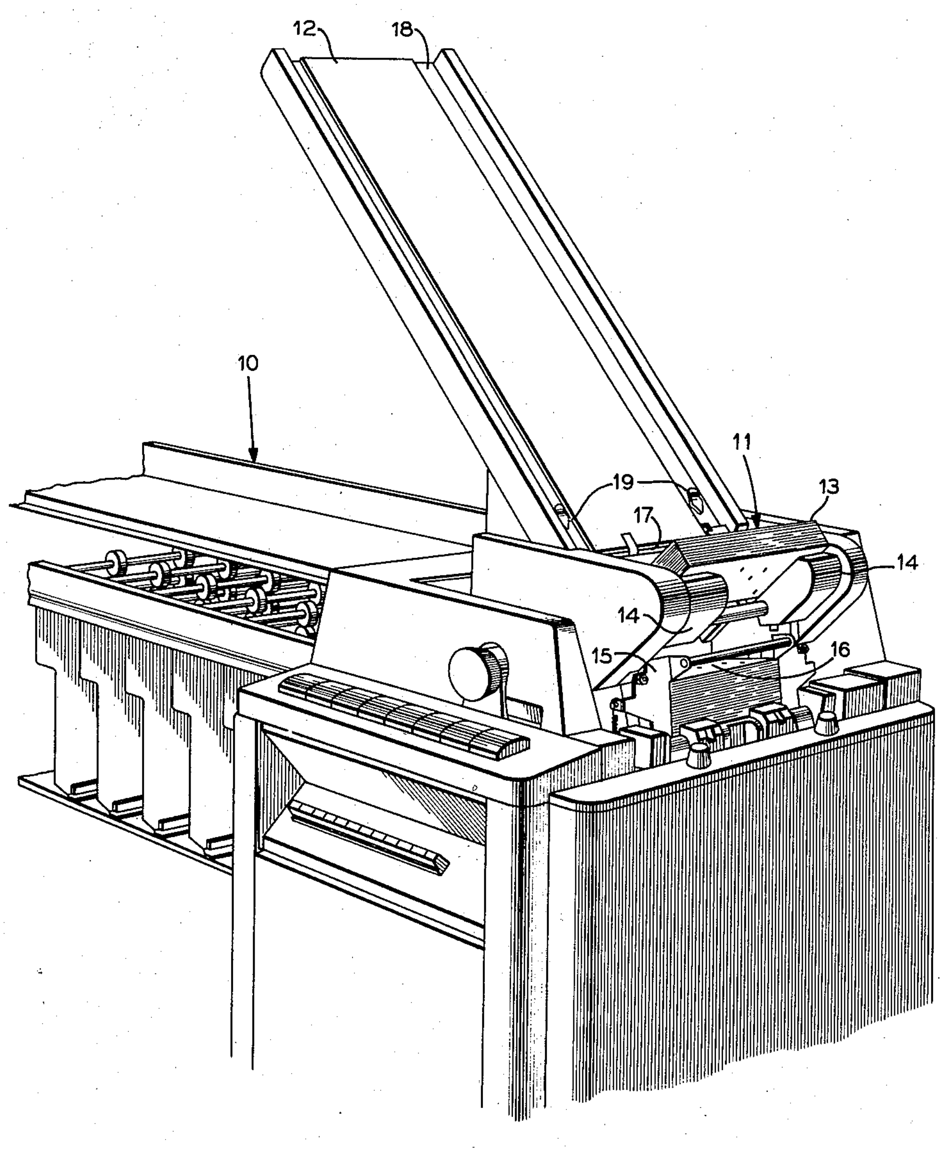
Figure 1 is a pictorial view of the subject card feeding and handling device for use with a record card sorter.

The subject card feeding and handling device 11, Figure 1, is shown as attached to a card sorter 10 for the purpose of illustration although it should be clear that the type of machine to which the said device is attached is immaterial to its operation. The said device comprises a magazine 12, in which cards 13 are stored and subsequently fed by feed wheel units 14 into the card hopper 16, and an oscillating element 15 for joggling the cards in the hopper and sensing the number of cards contained therein. The magazine 12 is hinged at 17, see also Figure 2, so that it may be raised when necessary for inspection of the machine underneath. The grooves 18 on each side of the magazine are provided to accommodate an open bottomed tray which may be used in conjunction with the magazine. Tray stops 19 are provided to hold this tray in the magazine. The instant invention is being described without describing said tray since the tray forms no part of the present invention.

Figure 7:
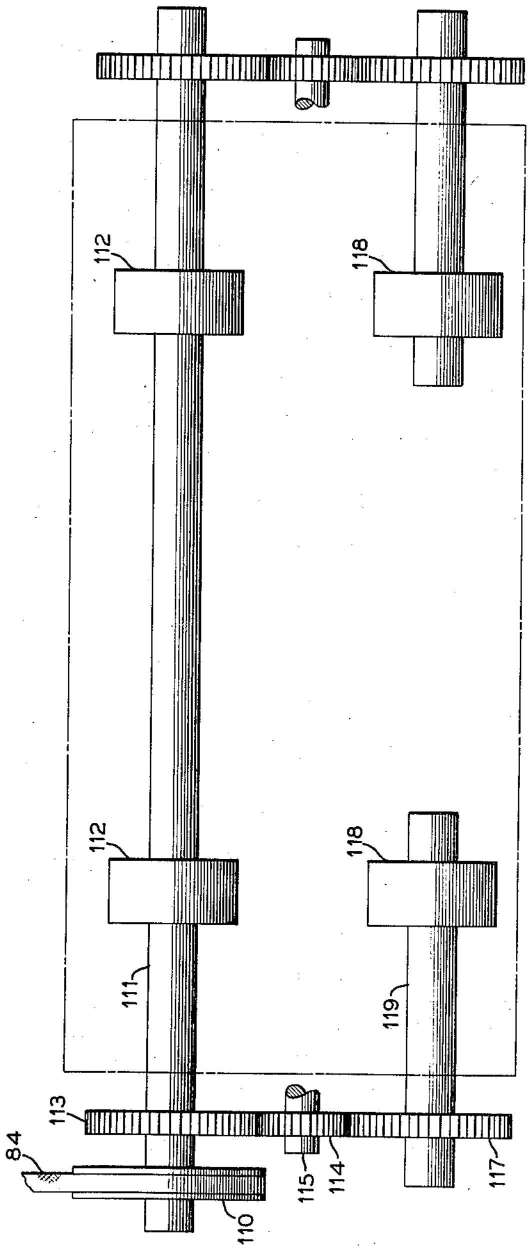
Figure 7 is a plan view of the feed wheels taken along a line 7—7 of Figure 2.

In the ordinary course of operation, an operator of the machine may place as few cards as desired or as many cards as the magazine is designed for into the magazine 12 with the first card resting against the feed wheel units 14; see Figure 7 for the card side of the units. If the feed hopper 16 is initially empty or there are less than a predetermined number of cards present, the feed wheels will be operated (after power to the machine is turned on) and cards from the magazine will be moved at a high velocity, for example 5000 c. p. m., into the hopper. As the batch of cards in the hopper is increased to a predetermined point, which may be around 300 cards, for example, the feed wheel units 14 are caused to stop so that no further cards are supplied to the hopper until the number of cards in the hopper drops below another predetermined number, for example 250. Thus, for roughly every 50 cards, since it is not necessary to meter the cards fed into the hopper too accurately, the feed wheel units 14 are operated to supply additional cards to the hopper from the magazine. With a card tray holding 3500 to 4000 cards as distinguished from 1000 cards for a conventional card hopper, the running time of the machine has been extended by a factor of 3½ times. It is to be understood that the values stated are merely illustrative for the purposes of description and should not be construed as limitations.

In the feeding mechanism there are duplicate sets of feed rollers 14, Figure 1, shown in detail in Figure 7, mounted on opposite sides of the feed on which the cards in the magazine will rest and be supported. When not operated, the feed rollers will maintain the cards in a fixed position. When the feed rollers are operated by means presently to be described, the cards are moved in a transverse direction to the magazine into the card hopper. By moving the cards transverse to the ones stored in the magazine, a high card speed can be obtained. As shown particularly in Figure 2, the cards from the magazine pass through an adjustable opening 140. This opening is adjusted by moving the members 150 and 152 relative to the stationary member 151 to which 150 and 152 are frictionally secured by screws 153. Member 151 extends across the feed hopper and supports the member 152. The variation in opening 140 allows adjustable fanning, i. e., the leading edges of the cards are displaced from one another, so that cards are fed into the hopper sequentially and in overlapped arrangement. By separating the cards from one another the static bond between cards in the magazine is decreased and the cards may be joggled into alignment with fewer oscillations of member 15.

Figure 2:
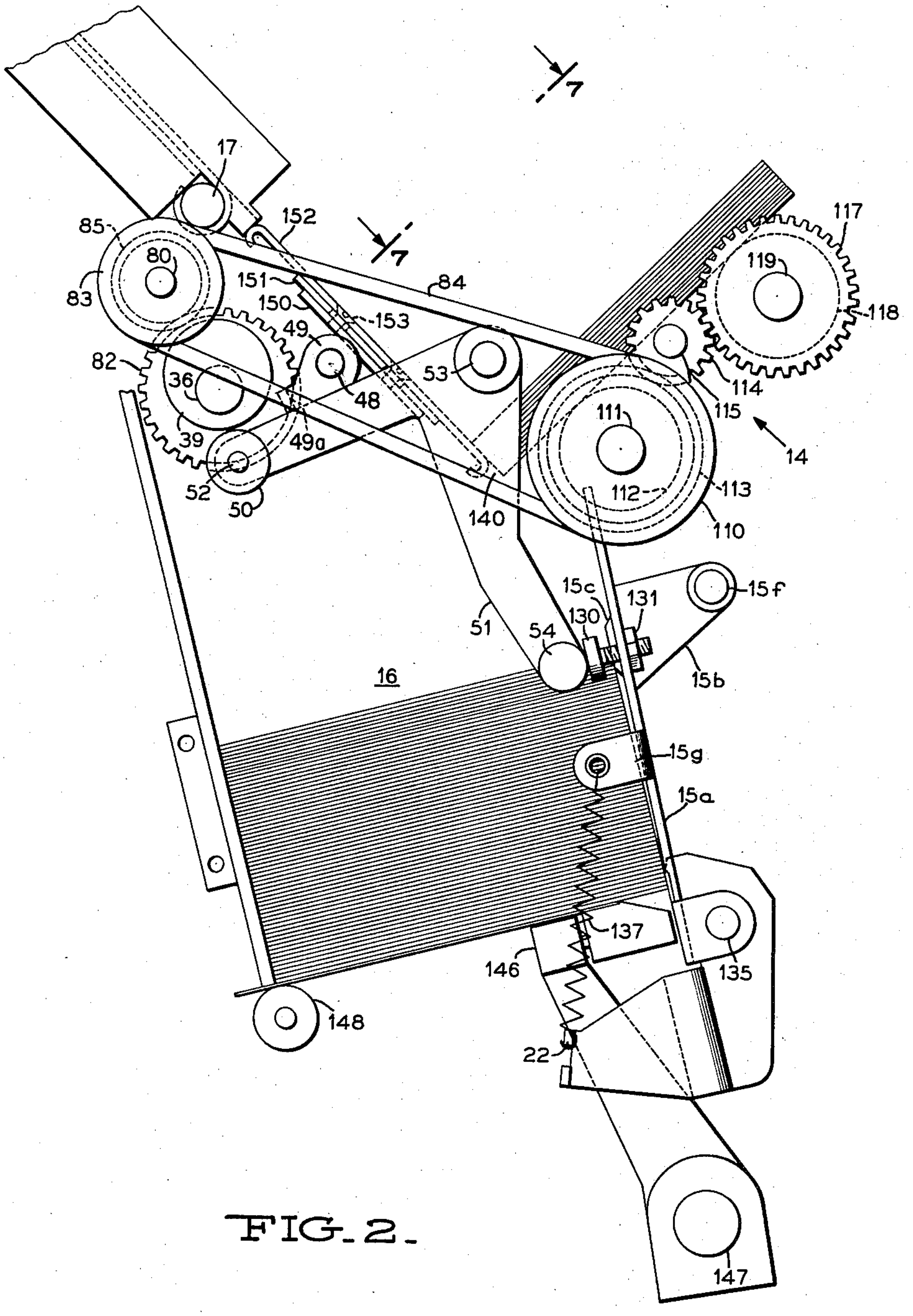
Figure 2 is a side view of the card feeding and handling device.
Figure 3:
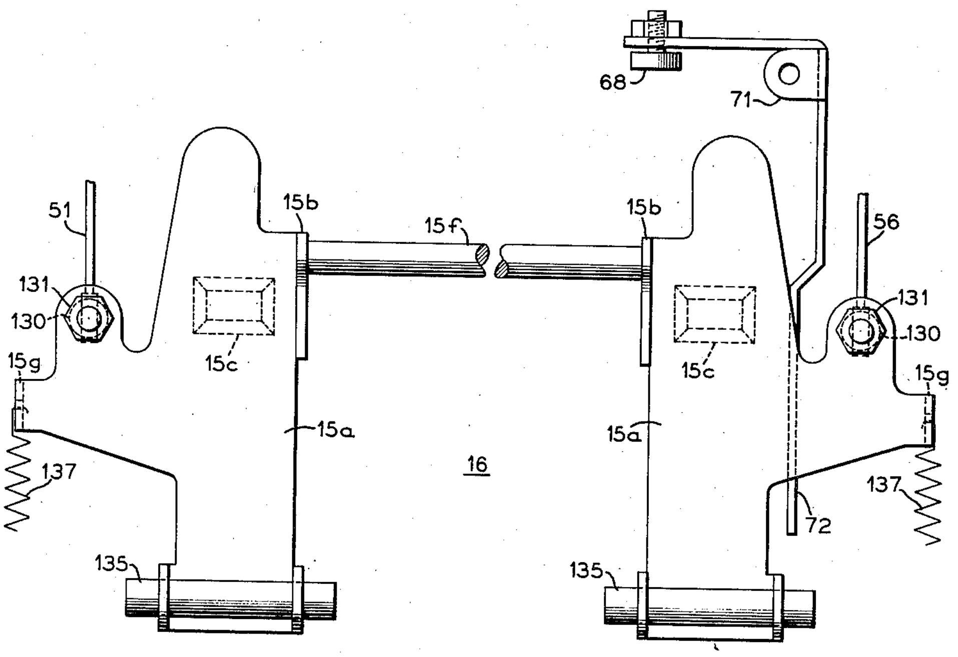
Figure 3 is a view of the front and side oscillating elements.

The oscillating element 15 is shown in detail in Figures 2 and 3 and comprises two vertical members 15*a* pivoted on axles 135 and connected to move together by a bar 15*f* connected in any suitable manner to ears 15*b*. Ears 15*g* have springs 137 connected through apertures in said ears and the springs are anchored at points 22 on said machine. The element 15 is therefore biased toward the card hopper 16. Adjustable studs 130 are held by nuts 131 which are fastened by any desired means to vertical members 15*a*. Protrusions 15*c* are formed into the members 15*a* by stamping or comprise separate units secured to members 15*a*. Cooperating with the adjustable studs 130 are arms 51 and 56.

The oscillating element 15 is biased toward the hopper 16 by springs 137 and moved away from the hopper periodically by arms 51 and 56 so that the element 15 oscillates about the axles 135. The studs 130 serve to regulate the position of contact of element 15 and arms 51 and 56. Protrusions 15*c* cooperate with the cards in the hopper 16 to stop the movement of element 15 toward the hopper when there are sufficient cards in the hopper to contact said protrusions. When the cards are below this level, the element 15 moves with the arms 51 and 56 until they reach their boundary condition as determined by the configuration of cams 39 and 38 at which point the movement of element 15 in this direction stops.

With reference to Figure 2, the principle of operation by which the number of cards in the hopper may be sensed is appreciated by noting that when the number of cards in the hopper exceeds a predetermined number, as in Figure 2, the element 15 is prevented from moving the arms 51 and 56 to their boundary conditions as determined by the configuration of the cams 38 and 39. When there are fewer cards than some predetermined number in the hopper, the arms 51 and 56 will be moved through a greater angle than when cards are present since protrusions 15*c* do not contact the cards in the hopper. The difference in movement of the arms for the various conditions may therefore be used for control purposes. This control is described in detail hereinafter.

Figure 4:
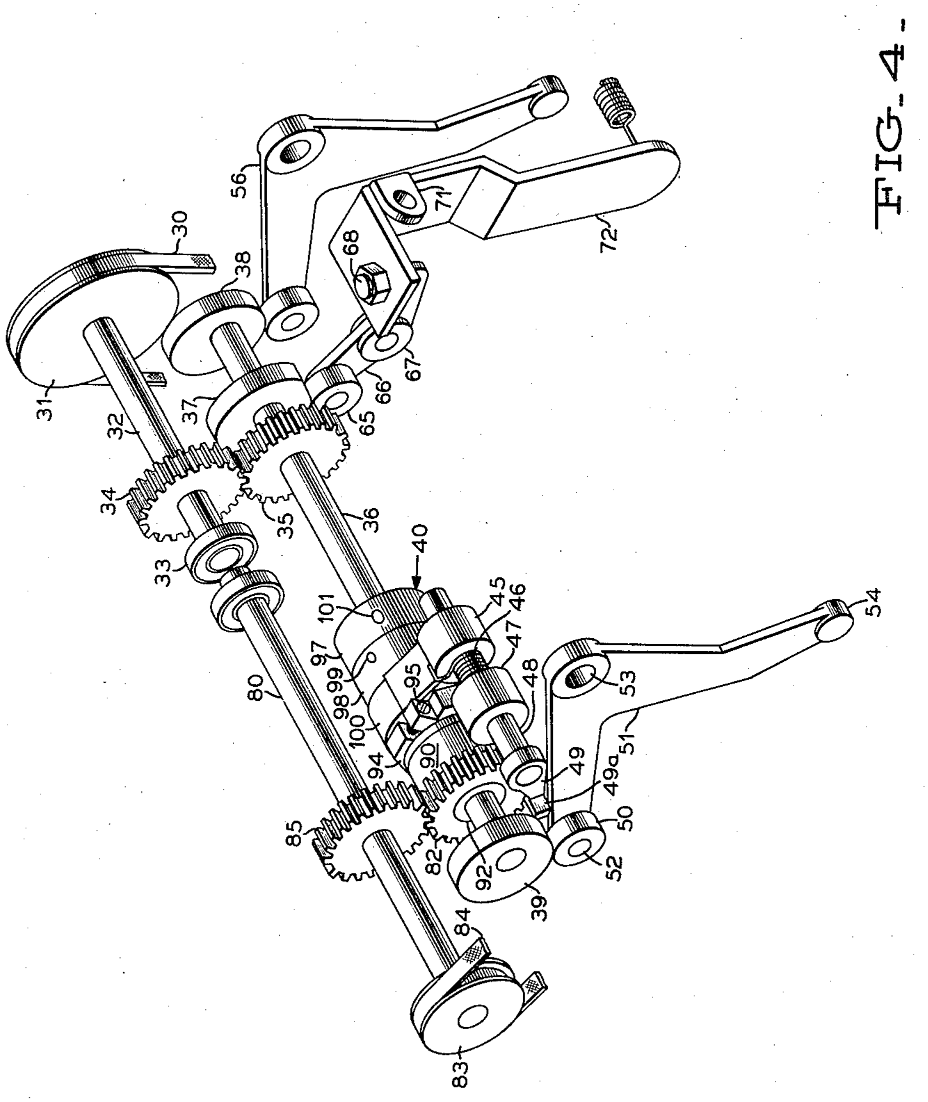
Figure 4 is an exploded schematic illustration of the mechanism in the said card feeding and handling device.

The mechanism of the card feeding and handling device is shown in a schematic illustration in Figure 4. A motive force (not shown) which may be a separate source of power for the auxiliary feed or the motor for the parent machine is connected by means of a belt 30 to a pulley 31 which operates to rotate a shaft 32 supported on one end by bearing 33. Attached to shaft 32 is a gear 34 which meshes with gear 35 to rotate the shaft 36. The shaft 36 has attached thereto three cams 37, 38 and 39 which operate to move the arms 66, 56 and 51, respectively, in a continuous oscillating motion. A spring clutch 40 is adapted to couple shaft 36 to shaft 80 through the gears 82 and 85 when a latch or detent 45 is released by the rotation of shaft 48.

When the clutch 40 is actuated, motion from shaft 36 is transmitted through clutch 40 to gear 82 which meshes with gear 85 which is fixed to shaft 80. The shaft 80 rotates pulley 83 over which a belt 84 is driven. The belt 84 is connected to a pulley 110, Figures 2 and 7, which drives a shaft 111 on which is mounted feed wheels 112. A gear 113 on shaft 111 drives a gear 114 connected to a shaft 115 which in turn drives a gear 117 connected to a shaft 119 which drives a feed wheel 118. The shaft 111 is connected across the face of the magazine as shown in Figure 7, to a duplicate set of gears, shafts and feed wheels. This collection of elements are shown as units 14 in Figure 1. Arm 51 has a roller 50 mounted by a pin 52 which bears against the cam 39. The arm 51 is pivoted at 53 and has a formed circular end 54. Arm 56 is identical. An arm 49 with a dog 49*a* is positioned in the path of arm 51 so that as arm 51 follows the cam to the lowest point on said cam, the arm 49 will be rotated to rotate the shaft 48 and consequently the detent 45. The detent 47 is freely movable on the shaft 48 but is biased by spring 46 to press closely against the sleeve 90.

When there are less than a predetermined number of cards in hopper 16, the element 15 moves arm 51 through an arc determined by the associated cam and actuates dog 49*a* and consequently latch 45, Figure 4, wherein shaft 80 is connected to shaft 36 to operate the feed wheel assemblies 14 to move cards from the magazine into the hopper.

This, it will be remembered, is distinguished from the operation when there are cards sufficient to engage the protrusions by the fact that in that operation the arm 51 does not follow the cam 39 throughout the entire cycle of cam 39. The arm 51 will not actuate clutch 40 unless there is sufficient force to move arm 51 such as caused by the element 15 pressing against arm 51 by reason of the spring bias 137. It is seen, therefore, that the difference in movement of arm 51 when there is more than a predetermined number of cards and less than a predetermined number is used to control the operation of the feed mechanism.

The operation of the apparatus is therefore one of sensing by means of protrusions 15*c* and operating the feed mechanism through actuating arms 51 to supply cards from the magazine. The cards which are supported on the feed wheel units 14, are supplied by the rotation of the feed wheels to the hopper 16. The spring clutch 40 forms no part of the present invention and is described with particularity in the patent to E. W. Gardinor et al., No. 2,647,581. However, in order that the action of the clutch may be understood without reference to said patent, a brief explanation of the clutch is hereinafter included.

Figure 5:
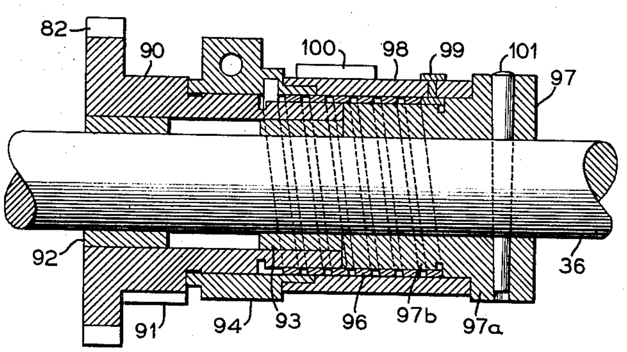
Figure 5 shows a sectional view of a spring clutch used in the magazine-to-hopper feed mechanism.
Figure 6:
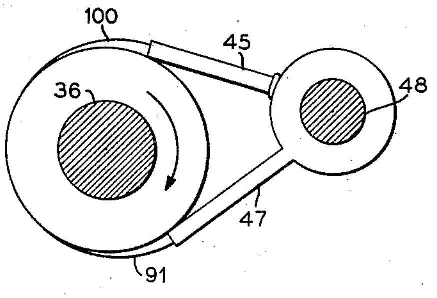
Figure 6 shows a side view of the clutch with cooperating latch detents.

With reference to Figures 4, 5 and 6, it can be seen that gear 82 has a sleeve portion 90 on which a detent 91 is formed. The gear 82 is free on shaft 36 by reason of bearings 92 and 93 so that the shaft 36 may rotate without moving the gear 82. A split ring 94 is frictionally secured to the sleeve 90 and tightened by a screw 95. One end of a spring 96 is mounted in the split. The other end of a spring is secured by rivet 99 to a sleeve 98 which rides freely over the shoulder of ring 94 and the shoulder 97*a* of a driving sleeve 97. A detent 100 is formed on the sleeve 98. The driving sleeve 97 is secured to shaft 36 by a pin 101 for rotation therewith.

With detent latches 45 and 47 to hold detents 100 and 91, as shown in Figures 4 and 6, the spring 96 is unwound sufficiently so that there will be no binding action between driving sleeve 97 and the spring 96 and consequently no movement of ring 94 and gear 85. When the detent latch 45 is moved clockwise and the detent 100 is released, the spring 96, which is of slightly smaller diameter than sleeve 97*b*, binds on sleeve 97*b* and motion from shaft 36 is transmitted to gear 82. The detent latch 47 moves over detent 91 as the shaft 36 rotates.

When the detent latch 45 is again moved into the path of detent 100 and stops the movement of sleeve 98, the spring is uncoiled by the momentum of the moving elements and the detent 91 is caught on the return oscillation of ring 94 by latch 47 after being unwound so that the spring is kept unwound.

Besides the function of sensing, the element 15 performs the function of joggling the cards along their length edge. The oscillating motion of the element 15 acts to strike the cards gently as they descend toward the feed and align the edges of the cards. The element 15 has cutout portions near the axle so that cards at the bottom of the hopper will not be bound by the joggler pushing these cards against the machine side of the hopper.

In Figure 3 an additional joggler 72 is shown. This joggler is used for aligning the cards along their width edge. The joggler 72 is situated flush with the side of the hopper and moves into said hopper to push the cards against the left wall of the hopper. Revolving with shaft 36 is a cam 37. An arm 66 pivoted at 67 has a roller 65 which bears against the cam 37. The other end of the arm 66 bears against an adjustable stud 68. The stud 68 is secured to the side joggler 72, which is pivoted at 71 so that movement of the arm 66 will induce a reciprocating motion to the joggler 72.

The joggler 72 is terminated above the floor of the hopper so that cards being fed into the feed rolls 148 of the machine by the feed knife 146 will not be subject to any binding force from the joggler. The feed knife 146 which is pivoted at 147 forms no part of the present invention and is shown in the application to G. A. Luning et al.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus of the class described comprising record card storage means, a card hopper, feed means associated with said storage means for feeding cards contained in said storage means to said hopper, card aligning means disposed adjacent said hopper and operative to engage the cards therein to align the same, and sensing means carried by said card aligning means and responsive to the quantity of cards fed to said hopper for controlling said feed means.

2. The apparatus of claim 1 including drive means operable to oscillate said sensing means and said aligning means continuously about a fixed point, said oscillations being damped by more than a predetermined number of cards in said hopper.

3. The apparatus of claim 2 further comprising clutch means connecting said drive means to said feed means, said sensing means being operable to actuate said clutch means when said oscillations are undamped whereby said feed means operates to feed cards to said hopper.

4. The apparatus of claim 3 wherein said drive means comprises a continuously rotating shaft, said apparatus further comprising a cam mounted on said shaft, an actuating arm cooperating with said cam and being moved in accordance with the configuration of said cam, said arm being positioned so that the movement of said arm operates to periodically move the sensing means away from said card hopper.

5. The apparatus of claim 4 including spring means for biasing said sensing means toward said card hopper in opposition to the motion of said actuating arm, said clutch means being mounted adjacent said arm and being responsive to a predetermined movement of said arms for actuating said feed means.

6. In combination with a card hopper, a record card storage means, feed means associated with said storage means for feeding cards in said storage means to said hopper, sensing means pivoted adjacent said hopper, actuating means cooperating with said sensing means and operable to move and to be moved by said sensing means wherein said sensing means and said actuating means may move through predetermined excursions, and means responsive to undamped excursions of said actuating means for operating said feed means to supply more cards to said hopper.

7. The apparatus of claim 6 wherein said last-mentioned means comprises a clutch mechanism and a drive means, said clutch mechanism connecting said drive means to said feed means, said clutch mechanism being mounted adjacent said actuating means and being responsive to the excursions of said last-mentioned means.

8. The apparatus of claim 7 further comprising cam means mounted on said drive means, said actuating means cooperating with said cam means and being responsive to the configuration thereof to move in a predetermined manner, said sensing means being biased toward said card hopper and being operable in response to said biasing to urge said actuating means against said cam means, said actuating means when forced against the lowest dwell on said cam means being operable to actuate said clutch means.

9. A card feeding device comprising card storage means for holding a plurality of cards, feed means fixed adjacent said storage means and forming an end thereof so that cards contained in said storage means will be fixed by engagement with said feed means, said feed means being operable to feed cards transversely with respect to said storage means, a card hopper, and sensing means fixed adjacent said card hopper to sense a predetermined number of cards in said hopper, said sensing means being operable to operate said feed means when said predetermined number of cards are present in said hopper whereby cards from said storage means are fed into said hopper.

10. The apparatus of claim 9 wherein said feed means comprise friction driving wheels; said driving wheels and the cards contained in said card storage means defining at their point of engagement a tangent whose direction is transverse with respect to the plurality of cards in said card storage means.

11. The apparatus of claim 10 further comprising an actuating arm for moving said sensing means away from said card hopper, spring means for moving said sensing means toward said card hopper, drive means, clutch means mounted adjacent said actuating arm, and operating when actuated to connect said drive means to said feed wheels, said clutch means being actuated when said sensing means moves said actuating arms more than a predetermined distance toward said hopper.

12. In combination with a card hopper, means for feeding cards to said hopper, oscillating means mounted adjacent said hopper operating to joggle cards being fed into said hopper along the length of said cards, and a second oscillating means mounted adjacent said card hopper operating to joggle cards along their width, said first and second oscillating means being operable to align the cards in said hopper.

13. The apparatus of claim 12 further comprising actuating means for moving said first oscillating means away from said hopper, biasing means fixed to said oscillating means for moving said first oscillating means toward said hopper, said biasing means being further operable to move said actuating means, and means responsive to a predetermined movement of said first oscillating means for operating said feed means.

14. The apparatus of claim 13 wherein said first oscillating means is limited in movement toward said hopper by more than a predetermined number of cards in said hopper wherein the movement of said actuating means is responsive to the number of cards in said hopper whereby said feed means is operated in accordance with the number of cards in said hopper.

15. A card feeding device for use with a card machine comprising a card storage magazine for storing a plurality of cards, a card hopper adapted to store a batch of cards for use in said machine, card feeding means associated with said storage magazine for feeding cards to said hopper, drive means, clutch means connecting said drive means to said feed means, cam means mounted for rotation on said drive means, an actuating arm cooperating with said cam means and movable in accordance with the configuration of said cam, and a spring biased element fixed adjacent said card hopper and biased toward said hopper, said actuating arm being operable to move said element away from said hopper and be moved by said biased element toward said hopper through predetermined excursions in accordance with high and low points on said cam, said clutch means being mounted in proximity to said actuating arm and being responsive to an undamped excursion toward said hopper for connecting said drive means to said feed means.

16. A card feeding device for use with a card machine comprising a card storage magazine for storing a plurality of cards, a card hopper adapted to store a batch of cards for use in said machine, card feeding means comprising a plurality of feed wheels fixed adjacent said card storage magazine and forming an end thereof so that cards contained in said magazine are fixed by engagement with said feed wheels, said card feeding means being operable to feed cards transversely with respect to said storage means to said hopper to maintain the number of said cards in said hopper within predetermined limits, drive means comprising a rotatable shaft, a cam mounted on said shaft for movement therewith, a clutch operable when actuated to connect said shaft to said feed means, an actuating arm cooperating with said cam means and movable in accordance with the configuration of said cam, actuator means for said clutch operated actuating arm so that said actuating arm will operate said actuator means upon a predetermined movement of said arm, and an element pivoted for oscillation adjacent said card hopper, said element being biased toward said card hopper by a spring attached thereto, said element being adapted to be moved away from said hopper by said actuating arm and adapted to be biased toward said hopper by said spring means wherein the element oscillates about its pivot points in accordance with the configuration of the cam on which the actuating arm rides, said batch of cards in said hopper being adapted when there are more than a predetermined number of these cards to contact said element and prevent a maximum excursion toward said hopper; said batch of cards, when there are less than some predetermined number of these cards, being ineffective to prevent a maximum excursion of said element wherein said element moves said actuating arm to operate the actuator means of said clutch, said feed means therefore being operated when there are less than some predetermined number of cards but being inoperative when there are more than said predetermined number of cards.

17. A card feeding device for use with a card machine comprising a card storage magazine for storing a plurality of cards, a card hopper adapted to store a batch of cards for use in said machine, card feeding means, said card feeding being operable to feed cards from said storage means to said hopper to maintain the number of said cards in said hopper within predetermined limits, drive means comprising a rotatable shaft, a plurality of cams and gears mounted on said shaft for movement therewith, a clutch mounted on said rotatable shaft and operable when actuated to connect said shaft to a gear associated with said clutch, said gear being connected to transmit motion from said rotatable shaft to said feed means, an actuating arm cooperating with one of said cam means and movable in accordance with the configuration of said cam, actuator means for said clutch comprising a detent latch mounted on a shaft on which an arm is formed for movement by said actuating arm so that said actuating arm will operate said detent latch upon a predetermined movement of said arm, an element pivoted for oscillation adjacent said card hopper, said element being biased toward said card hopper by a spring attached thereto, protrusions formed on said element and cooperating with the batch of cards in said card hopper, stud means mounted on said element and cooperating with said actuating arms, said element being adapted to be moved away from said hopper by said actuating arms and adapted to be biased toward said hopper by said spring means wherein the element oscillates about its pivot points in accordance with the configuration of the cam on which the actuating arm rides, said batch of cards in said hopper being adapted when there are more than a predetermined number of these cards to contact said protrusions and prevent a maximum excursion toward said hopper, said batch of cards, when there are less than some predetermined number of these cards, being ineffective to prevent a maximum excursion of said element wherein said element moves said actuating arm to operate the actuator means of said clutch, said feed means therefore being operated when there are less than some predetermined number of cards but being inoperative when there are more than said predetermined number of cards.

18. A card feeding device for use with a card machine comprising a card storage magazine for storing a plurality of cards, a card hopper adapted to store a batch of cards for use in said machine, card feeding means comprising a plurality of feed wheels fixed adjacent said card storage magazine and forming an end thereof so that cards contained in said magazine are fixed by engagement with said feed wheels, said card feeding means being operable to feed cards transversely with respect to said storage means to said hopper to maintain the number of said cards in said hopper within predetermined limits, drive means comprising a rotatable shaft, a plurality of cams and gears mounted on said shaft for movement therewith, a clutch mounted on said rotatable shaft and operable when actuated to connect said shaft to a gear associated with said clutch, said gear being connected to transmit motion from said rotatable shaft to said feed means, an actuating arm cooperating with one of said cam means and movable in accordance with the configuration of said cam, actuator means for said clutch comprising a detent latch mounted on a shaft on which an arm is formed for movement by said actuating arm so that said actuating arm will operate said detent latch upon a predetermined movement of said arm, an element pivoted for oscillation adjacent said card hopper, said element being biased toward said card hopper by a spring attached thereto, protrusions formed on said element and cooperating with the batch of cards in said card hopper, stud means mounted on said element and cooperating with said actuating arms, said element being adapted to be moved away from said hopper by said actuating arms and adapted to be biased toward said hopper by said spring means wherein the element oscillates about its pivot points in accordance with the configuration of the cam on which the actuating arm rides, said batch of cards in said hopper being adapted when there are more than a predetermined number of these cards to contact the protrusions on said element to prevent a maximum excursion toward said hopper; said batch of cards, when there are less than some predetermined number of these cards, being ineffective to prevent a maximum excursion of said element wherein said element moves said actuating arm to operate the actuator means of said clutch, said feed means therefore being operated when there are less than some predetermined number of cards but being inoperative when there are more than said predetermined number of cards.

19. A card feeding device for use with a card machine comprising a card storage magazine for storing a plurality of cards, a card hopper adapted to store a batch of cards for use in said machine, card feeding means comprising a plurality of feed wheels fixed adjacent said card storage magazine and forming an end thereof so that cards contained in said magazine are fixed by engagement with said feed wheels, said card feeding means being operable to feed cards transversely with respect to said storage means to said hopper to maintain a number of said cards in said hopper within predetermined limits, drive means comprising a rotatable shaft, a plurality of cams and gears mounted on said shaft for movement therewith, a clutch mounted on said rotatable shaft and operable when actuated to connect said shaft to a gear associated with said clutch, said gear being connected to transmit motion from said rotatable shaft to said feed means, an actuating arm cooperating with one of said cam means and movable in accordance with the configuration of said cam, a joggler forming at least part of one wall of said hopper and pivoted for movement in accordance with the configuration of a second cam wherein said joggler aligns the cards in said hopper along the width edge, actuator means for said clutch comprising a detent latch mounted on a shaft on which an arm is formed for movement by said actuating arm so that said actuating arm will operate said detent latch upon a predetermined movement of said arm, an element pivoted for oscillation adjacent said card hopper, said element being biased toward said card hopper by a spring attached thereto, protrusions formed on said element and cooperating with the batch of cards in said card hopper, stud means mounted on said element and cooperating with said actuating arms, said element being adapted to be moved away from said hopper by said actuating arms and adapted to be biased toward said hopper by said spring means wherein the element oscillates about its pivot points in accordance with the configuration of the cam on which the actuating arm rides, said oscillating element operating to contact the cards fed from said storage magazine to align said cards along their length edge, said batch of cards in said hopper being adapted when there are more than a predetermined number of these cards to contact said protrusions and prevent a maximum excursion toward said hopper; said batch of cards, when there are less than some predetermined number of these cards, being ineffective to prevent a maximum excursion of said element wherein said element moves said actuating arm to operate the actuator means of said clutch, said feed means therefore being operated when there are less than some predetermined number of cards but being inoperative when there are more than said predetermined number of cards.

20. Apparatus of the class described comprising record card storage means, a card hopper, feed means associated with said storage means for feeding cards contained in said storage means to said hopper, card aligning means disposed adjacent said hopper and operative to engage the cards therein to align the same and means responsive to a predetermined degree of misalignment of said cards for rendering said feed means inoperative.

References Cited in the file of this patent

UNITED STATES PATENTS 2,733,064 Martin ---------------- Jan. 31, 1956